United States Patent
Wang et al.

(10) Patent No.: US 7,429,393 B2
(45) Date of Patent: Sep. 30, 2008

(54) PROCESS FOR FORMING CENTIPEDE POLYMER GELS

(75) Inventors: Xiaorong Wang, Hudson, OH (US); Victor F. Foltz, Akron, OH (US); Terrence E. Hogan, Akron, OH (US); William M. Cole, Clinton, OH (US); Naruhiko Mashita, Yokohama (JP); Yuichiro Wakana, Yokohama (JP); Tadashi Utsunomiya, Yokohama (JP)

(73) Assignee: Bridgestone Corporation, Chuo-ku, Tokyo (JP)

( * ) Notice: Subject to any disclaimer, the term of this patent is extended or adjusted under 35 U.S.C. 154(b) by 1122 days.

(21) Appl. No.: 09/889,366

(22) PCT Filed: Mar. 23, 2001

(86) PCT No.: PCT/US01/09313

§ 371 (c)(1),
(2), (4) Date: Jul. 13, 2001

(87) PCT Pub. No.: WO01/70822

PCT Pub. Date: Sep. 27, 2001

(65) Prior Publication Data

US 2003/0091527 A1    May 15, 2003

(51) Int. Cl.
*A61K 31/27* (2006.01)
(52) U.S. Cl. .................. 424/484; 424/400
(58) Field of Classification Search .............. 424/400, 424/484, 486; 525/74; 524/474
See application file for complete search history.

(56) References Cited

U.S. PATENT DOCUMENTS

| | | | |
|---|---|---|---|
| 3,414,551 A | 12/1968 | Reid et al. | |
| 3,480,580 A | 11/1969 | Joyner et al. | |
| 3,481,910 A | 12/1969 | Brunson | |
| 3,577,365 A | 5/1971 | Folzenlogen et al. | |
| 3,862,265 A | 1/1975 | Steinkamp et al. | |
| 4,506,056 A | 3/1985 | Gaylord | |
| 5,244,971 A | 9/1993 | Jean-Marc | |
| 5,905,116 A * | 5/1999 | Wang et al. | 525/74 |
| 5,910,530 A | 6/1999 | Wang et al. | 524/534 |
| 5,912,296 A | 6/1999 | Wang et al. | |
| 6,048,930 A | 4/2000 | Wang et al. | |
| 6,054,532 A | 4/2000 | Wang et al. | 525/66 |
| 6,107,409 A | 8/2000 | Hogan et al. | |
| 6,184,292 B1 | 2/2001 | Hall et al. | |
| 6,191,217 B1 | 2/2001 | Wang et al. | |
| 6,204,354 B1 | 3/2001 | Wang et al. | |
| 6,228,939 B1 | 5/2001 | Wang et al. | |
| 6,248,825 B1 | 6/2001 | Wang et al. | |
| 6,248,827 B1 | 6/2001 | Wang et al. | 525/91 |

FOREIGN PATENT DOCUMENTS

| | | |
|---|---|---|
| DE | 42 41 538 A1 | 6/1994 |
| EP | 0 322 905 A2 | 7/1987 |
| JP | 6-248017 | 9/1994 |

* cited by examiner

*Primary Examiner*—Thurman K. Page
*Assistant Examiner*—Blessing Fubara
(74) *Attorney, Agent, or Firm*—Meredith E. Palmer; Ann M. Skerry

(57) ABSTRACT

A process that enables the formation of a high damping, soft polymer gel includes reacting a maleimide copolymer with a maleated polyalkylene and an alkyl diamine under substantially dry conditions sufficient to form a polyalkylene-grafted maleimide copolymer product which then is dispersed with an extender sufficient to form the gel. The steps can be carried out sequentially in a high shear mixer without the need for intermediate steps of cooling and grinding the reaction product of one step before proceeding to the next.

19 Claims, No Drawings

US 7,429,393 B2

PROCESS FOR FORMING CENTIPEDE POLYMER GELS

BACKGROUND OF THE INVENTION

This invention relates to a method for producing polyalkylene-grafted poly(alkenyl benzene-co-maleimide) polymers and the use of such polymers, when oil extended, in producing high damping materials.

Two or more polymers may be blended together to form a wide variety of random or structured morphologies to obtain products that offer potentially desirable combinations of characteristics. However, many potential combinations may be difficult or even impossible to achieve in practice through simple blending. Frequently, the polymers are thermodynamically immiscible, which precludes generating a truly homogeneous product. This immiscibility is not a problem where a two-phase structure is desirable; however, the interactions (or lack thereof) at the interface between the two phases very often lead to problems. For example, high interfacial tension and poor adhesion between the phases is common. The interfacial tension, along with high viscosities, contributes to the inherent difficulty of imparting the desired degree of dispersion to such random mixtures and to their subsequent lack of stability. This gives rise to gross separation or stratification during later processing or use. Poor adhesion leads in part to the weak and brittle mechanical behavior often observed in dispersed blends and may render useless some highly structured morphologies.

Free-radically initiated polymerizations of maleic anhydride with vinyl monomers, such as styrene and isobutylene, are known. Further, imidization of maleic anhydride with a primary amine group also is known.

Monofunctional N-alkyl and N-aryl maleimides have been used extensively to improve the heat stability of (co)polymers prepared from vinyl monomers. In one method, maleimides are first reacted with bulk resin(s) such as, for example, ABS (poly(acrylonitrile-co-butadiene-co-styrene)); blends of poly (acrylonitrile-co-butadiene) and poly(styrene-co-acrylonitrile); PVC (poly(vinyl chloride)); SAN (poly(styrene-co-acrylonitrile)); PMMA (poly(methyl methacrylate)); and the like. The copolymers formed are then reacted with monomers, such as styrene or acrylonitrile. However, a more preferred industrial practice is to make copolymers of maleimides with other monomers, such as styrene and optionally acrylonitrile, and to blend the copolymer with a resin, such as an ABS or SAN resin. In any event, the polymer compositions are adjusted so that the copolymers are fully compatible with the bulk resins as shown by the presence of a single glass transition point via, e.g., differential scanning calorimetry (DSC).

A batch method for preparing a grafted copolymer having the impact strength of polypropylene and the elastomeric properties of a block copolymer but which avoids the above-referenced problems remains desirable.

SUMMARY OF THE INVENTION

Briefly, the present invention provides a process for forming an extended polyalkylene-grafted interpolymer. The process involves use of a polymer that includes mer units derived from a maleic anhydride and mer units derived from at least one of a vinyl aromatic monomer and an $R^1(R^2)$ethylene monomer, in which $R^1$ and $R^2$ independently are selected from H and substituted or unsubstituted $C_1$-$C_{20}$alkyl or alkoxyl groups. This polymer is mixed with a maleated polyalkylene to provide a blend. To the blend is added a diamine, which reacts with both the mer units derived from maleic anhydride and with the maleated polyalkylene to form a polyalkylene-grafted interpolymer. This interpolymer is allowed to cool before an extender is added so as to provide the extended polyalkylene-grafted interpolymer.

In another aspect, the present invention provides a single batch process for preparing a polymer composition that includes a polyalkylene-grafted interpolymer. In the process, an interpolymer that includes mer units derived from maleic anhydride and mer units derived from at least one of a vinyl aromatic and $R^1(R^2)$ethylene (with $R^1$ and $R^2$ being defined as above) is provided in a mixing vessel. From this interpolymer is formed a maleimide interpolymer by reacting an amine with a portion of the mer units derived from maleic anhydride. From about 1 to about 50 weight percent of a maleated polyalkylene is added to from about 50 to about 99 weight percent of the maleimide interpolymer. From about 0.1 to about 10 weight percent of a diamine is mixed with the maleimide interpolymer and maleated polyalkylene to form the polyalkylene-grafted interpolymer.

The oil (or low molecular weight component)-extended product produced (i.e., extended, grafted "centipede" polymer of a maleated polypropylene and a poly(alkenyl benzene-co-maleimide) or poly($R^1(R^2)$ethyl-co-maleimide) is useful in producing high damping and soft materials. It exhibits improved properties, including a Shore A hardness of less than 35, high damping properties, and a service temperature of about 100° C. The method of the present invention allows a grafted centipede polymer to be formed in a single batch process, in no longer than about one hour.

The following definitions apply hereinthroughout unless a contrary intention is expressly indicated:

"interpolymer" is a polymer that includes mer units derived from two or more different monomers;

"vinyl aromatic" and "alkenyl benzene" are used interchangeably;

"maleic anhydride" encompasses dicarboxylic acids, including maleic anhydride, which can form an interpolymer with an alkenyl benzene or $R^1(R^2)$ethylene, the interpolymer having mer units derived from the dicarboxylic acid which are capable of reaction with an amine functional group;

"maleimide" encompasses the reaction product of an amine and the mer unit derived from a dicarboxylic acid, described above;

"$R^1(R^2)$ ethyl" means mer units of the general formula —$CR^1R^2CH_2$— which are derived from $R^1(R^2)$ ethylene monomers ($R^1R^2C$=$CH_2$) where $R^1$ and $R^2$ are the same or different substituents on the same α-carbon atom and are independently selected from H and unsubstituted and substituted $C_1$-$C_{20}$ alkyl groups.

BRIEF DESCRIPTION OF THE DRAWING

FIG. 1 is a side view of a high shear mixer according to the present invention.

DETAILED DESCRIPTION OF PREFERRED EMBODIMENTS

A polyalkylene-grafted interpolymer of a poly(alkenyl benzene-co-maleimide) or poly($R^1(R^2)$alkyl-co-maleimide) may be conveniently prepared in a one or two-step batch process that reduces processing time. The interpolymer may be extended to form a gel. These gels preferably contain 100 parts by weight (pbw) of one of the just-described interpolymers with a maleated polyalkylene grafted thereto and 10 to 10,000 pbw, preferably 30 to 1000 pbw, of an extender. The maleated polyalkylene is grafted through at least one functional linkage formed by a crosslinking reaction with a diamine grafting agent.

The grafted polymers of the present invention are glassy materials that can be extended to form thermoreversible gels useful for damping applications. The extender may be an oil or a low molecular weight component For purposes of this invention, the maleic anhydride copolymers (i.e., interpolymers that have yet to undergo imidization) encompass random, block, and stereospecific interpolymers, including interpolymers having alternating alkenyl benzene-contributed or $R^1(R^2)$ethyl-contributed units and maleic anhydride-contributed units along the polymer backbone. Even where such units alternate along the polymer backbone, which typically would be described as poly(M-alt-maleic anhydride) where M is alkenyl benzene or $R^1(R^2)$ ethyl, such polymers are encompassed herein within the description poly(M-co-maleic anhydride). This terminology follows through to interpolymers that have undergone imidization.

A preferred maleic anhydrides is maleic anhydride itself, although other dicarboxylic acids also are contemplated.

Processes for forming such maleic anhydride interpolymers are known. Preparation of interpolymers from electron donor monomers, such as styrene, and electron acceptor monomers, such as maleic anhydride, as a result of complexation of the electron acceptor monomers may be carried out either in the absence or presence of an organic free radical initiator in bulk or in an inert hydrocarbon or halogenated hydrocarbon solvent such as benzene, toluene, hexane, $CCl_4$, chloroform, and the like.

Preferred alkenyl benzene monomers include styrene and α-methylstyrene. Suitable, but less preferred alternatives include p-methylstyrene, 4-phenylstyrene, m-methylstyrene, o-methylstyrene, p-tert-butylstyrene, dimethylstyrene, and the like.

Preferred $R^1(R^2)$ethylene monomers contain from 4 to about 40 carbon atoms. $R^1$ and $R^2$ are the same or different substituents on the same α-carbon atom of the ethyl group and are selected from unsubstituted and substituted $C_1$-$C_{20}$ alkyl and alkoxy groups. Examples of such groups include methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyoctyl, methoxynonyl, ethoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyheptyl, propoxyoctyl, propoxynonyl, propoxydecyl, butoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, heptyloxypentyl, heptyloxyhexyl, heptyloxyheptyl, heptyloxyoctyl, heptyloxynonyl, heptyloxydecyl, octyloxymethyl, oxtyloxyethyl, octyloxypropyl, octyloxybutyl, octyloxypentyl, octyloxyhexyl, octyloxyheptyl, oxtyloxynonyl, octyloxyoctyl, decyloxymethyl, decyloxyethyl, decyloxypropyl, decyloxybutyl, dcyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-methylpentyl, 2-methylhexyl, 2-methylheptyl, 2-methyloctyl, 2,3,3-methylbutyl, 3-methylpentyl, 2,3-dimethylpentyl, 2,4-dimethylpentyl, 2,3,3,4-tetramethylpentyl, 3-methylhexyl, 2,5-dimethylhexyl, and the like. Isobutylene is preferred. Where at least one of $R^1$ and $R^2$ is a substituted alkyl or alkoxy group, that group preferably is non-reactive with the remaining components of the ultimate centipede polymer (examples of which might include an alkoxyalkyl radical having $C_2$-$C_{20}$ carbon atoms, —Cl, —OH, —COOH, and —CN). Preferably, at least one of $R^1$ and $R^2$ is not H, and preferably at least one is an unsubstituted or substituted $C_1$-$C_{20}$ alkyl group.

The poly(alkyl benzene-co-maleic anhydride) or poly($R^1$ ($R^2$)ethyl-co-maleic anhydride) for use in the present invention is an interpolymer containing from about 5 to 99 mole % of maleic anhydride-contributed mer units, with the remainder being alkyl benzene-contributed mer units or $R^1(R^2)$ ethyl-contributed mer units, respectively. Preferred interpolymers contain from 20 to 50 mole percent of maleic anhydride-contributed mer units. A particularly preferred alkenyl benzene-type polymer is poly(styrene-co-maleic anhydride) derived from 50 mole % of maleic anhydride and 50 mole % of styrene. A particularly preferred $R^1(R^2)$ethylene-type polymer is derived from 50 mole % of maleic anhydride and 50 mole % of $R^1(R^2)$ethylene. Although the mer units contributed by maleic anhydride and the co-monomer can be randomly or alternatingly distributed in the backbone chain, such mer units preferably alternate along the chain.

The poly(alkenyl benzene-co-maleic anhydride) or poly ($R^1(R^2)$ethyl-co-maleic anhydride) has a weight average molecular weight ($M_w$) of from about 1000 to about 500,000 or higher, preferably from about 10,000 to 500,000, and most preferably from about 150,000 to about 450,000.

Preferred compositions for the centipede polymers are polymer compositions of poly(styrene-co-maleimide), formed by reacting a portion of the maleic anhydride monomer units of a poly(styrene-co-maleic anhydride) with a primary amine. Similarly, polymer compositions of poly($R^1(R^2)$ ethyl-alt-maleimide), such as poly(isobutylene-alt-maleimide), are formed by reacting a portion of the maleic anhydride-derived mer units of a poly($R^1(R^2)$ethyl-alt-maleic anhydride), such as poly(isobutylene-alt-maleic anhydride) with a primary amine. Suitable primary amines include, but are not limited to alkyl amines; alkyl benzyl amines; alkyl phenyl amines; alkoxybenzyl amines; alkyl aminobenzoates; alkoxy aniline; and other linear primary amines. These amines preferably contain from 1 to 50 carbon atoms, preferably, 6 to 30 carbon atoms, in their alkyl and alkoxy substituents. The alkyl and alkoxy substituents on these primary amines can be linear or branched, preferably linear, and saturated or unsaturated, preferably saturated. Exemplary amines include hexylamine, octylamine, dodecylamine, and the like.

Maleimide copolymers are classified as centipede polymers, which have high molecular weight spines connected with many relatively short side chains; the length of the main chain usually is at least as long as the entanglement length (which herein is defined as an order of magnitude of 100 repeating units) while the length of the side chains is much smaller than the entanglement length. They are formed through imidization of a portion of the mer units contributed by maleic anhydride. In a poly(alkenyl benzene-co-maleimide), an example of which is poly(styrene-co-maleimide), imidization is accomplished by an amine, preferably a primary alkylamine; in a poly($R^1(R^2)$ethyl-co-maleimide), an example of which is poly(isobutylene-co-maleimide), imidization is accomplished by a primary amine.

At least a portion of the maleic anhydride-contributed units are not reacted with amine and thus remain available for coupling with a maleated polypropylene via a diamine coupling agent. These unreacted maleic anhydride-contributed units preferably comprise from about 0.01 to about 5 weight percent of the interpolymer.

The poly(alkenyl benzene-co-maleimide) can be formed by reacting a poly[(alkenyl benzene)-co-(maleic anhydride)] with an amine at a temperature of from about 15° to about 300° C., more preferably from about 160° to about 210° C. Similarly, the poly($R^1(R^2)$ethyl-co-maleimide) can be formed by reacting a poly[$R^1(R^2)$ethyl-co-(maleic anhydride)] with a primary amine at temperature of from about 15° to about 250° C. Both types of imidization preferably occur at from about slightly above vacuum to about 2.0 MPa under substantially dry conditions.

The centipede polymer can be prepared by, for example, blending, milling or internal batch mixing. A rapid and convenient method of preparation comprises heating a mixture of the components to a temperature of about 50° to about 290° C. The polymers preferably are manufactured by mixing and dynamically heat-treating the components described above, namely, by melt-mixing. As for the mixing equipment, any conventional equipment such as a closed-type Banbury mixer, closed type Brabender mixer, extruding machine, kneader, continuous mixer, high shear mixer, or the like, is acceptable. A high shear mixer is particularly preferred as it permits a batch-type reaction process, in which the reactants are added sequentially, to be used without a need for cooling and grinding reaction intermediates.

The centipede polymer subsequently is graft-reacted through a difunctional linking or grafting agent to a maleated polyalkylene to yield a grafted polymer having at least one polyalkylene segment grafted thereto through the at least one functional linkage(s) thus formed. A typical reaction, using an alkenyl benzene copolymer as a starting material and octyl amine as imidizer, is shown below:

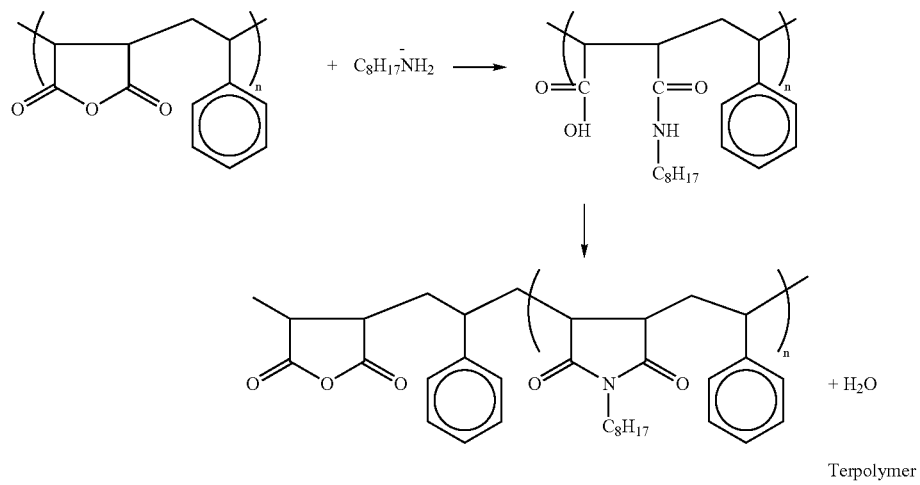

Terpolymer

Grafting of the resulting maleimide copolymer can be represented as

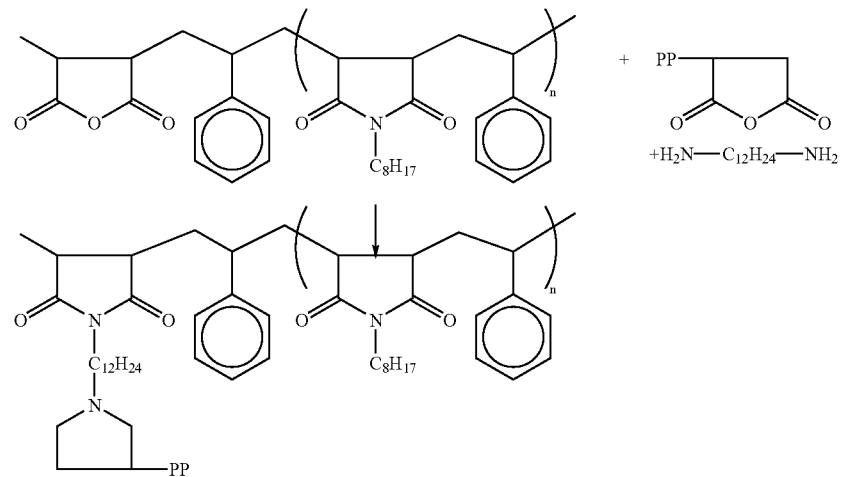

Where PP is polypropylene

A small number of maleic anhydride mer units in the starting interpolymer are not reacted in the first step with amine, which can be accomplished by adding the latter in a less than stoichiometric amount. In the second reaction, maleated polyalkylene and a crosslinking agent (e.g., 1,12-dodecane diamine) are added to link the maleated polyalkylene to the remaining unreacted maleic anhydride groups.

Suitable polyalkylenes for forming the maleated polyalkylene include polypropylene, polyethylene, ethylene/propylene interpolymers, EP rubber, EPDM rubber, and polymers of any of these monomers with one or more higher α-olefins, such as 1-butene, 1-hexene, 1-octene, and the like. Particularly preferred is polypropylene. The maleated polypropylene may be any of the known polypropylene compounds that are subsequently maleated by methods known in the art. The polypropylene grafted segment or segments have weight average molecular weights ($M_w$) of from about 10,000 up to about 10,000,000 or more, preferably from about 20,000 to about 300,000.

The crystallinity or tacticity of the polypropylene may vary from being substantially amorphous to being completely crystalline, that is from about 10-100% crystallinity. Typically, because of the extensive commercial use of isotactic polypropylene, the grafted polypropylene will be substantially crystalline, e.g., greater than about 90% crystalline. Generally, the polypropylene is substantially free of ethylene; however, under certain circumstances, small amounts of ethylene (on the order of less than about 5-10% by weight) may be incorporated. Furthermore, in certain instances, the polypropylene may contain small amounts of ethylene in the form of copolymers known as "reactor copolymers."

Propylene can be polymerized to form isotactic polypropylene in the presence of stereospecific Ziegler-Natta catalyst systems comprising a transition metal compound and an organometallic compound. Suitable compounds of transition metals are those of Groups 4 to 6 and 8 of the Periodic Table of elements, preferably titanium compounds and, most preferably, titanium halides. Suitable organometallic compounds are those of elements of Groups 1 to 3 of the Periodic Table, especially aluminum alkyls and aluminum alkyl halides. Illustrative examples include $TiCl_3$ and $TiCl_4$ as catalysts and triethylaluminum chloride and diethyl aluminum chloride as co-catalysts. If desired, these transition metal catalyst systems can be supported on, for example, silica gel or metal oxides and dihalides such as MgO, $MgCl_2$, $ZnCl_2$, and the like. Such systems can be reacted together and can be complexed with a variety of Lewis base electron donors.

Molecular weight control typically is achieved by incorporating $H_2$ via a feed stream into the polymerization reactor. Hydrogen is added at about 0 to 30 mole % based on the total monomer. Polymerization preferably is conducted according to the slurry method employing an inert hydrocarbon diluent or liquid propylene as the vehicle. The polymerization temperature can be in the range of about 50° to about 100° C. and is preferably in a range of about 60° to about 80° C. Polymerization pressure can also vary over a wide range, for example, between atmospheric pressure and 3.7 MPa. Such procedures and components are only illustrative of the knowledge in the art with respect to polypropylene polymerization. For a general review, see "Olefin Polymers (Polypropylene)" in *Kirk-Othmer Encyclopedia of Chemical Technology*, 3d ed., vol. 16, pp. 453-69 (J. Wiley & Sons, 1981).

Maleation of the polypropylene compound to maleated polypropylene is conveniently accomplished by heating a blend of polypropylene and ethylenically unsaturated carboxyl group-containing compounds, e.g., maleic anhydride, within a range of about 150° to 400° C., often in the presence of free radical initiators such as organic peroxides. Free-radical grafting of the carboxyl group-containing compounds onto the polypropylene readily results. Methods of preparing these grafted polymers are known in the art as illustrated in, for example, U.S. Pat. Nos. 3,480,580; 3,481,910; 3,577,365; 3,862,265; 4,506,056, and 3,414,551, as well as Minoura et al., *J. Appl. Poly. Sci.*, 1625 (1969). Use of heat and/or physical shearing, optionally with the free radical initiators, in such equipment as extruders, masticators, and the like, to accomplish simultaneously a controlled degradation in molecular weight of the polypropylene along with the free radical grafting of the maleic anhydride also is possible.

Conducting the maleation with such amounts of maleic anhydride and free-radical initiators and under conditions of temperature and shearing such that free radical sites on the polypropylene are formed substantially at the time of scission of the polypropylene chains and are formed at the point of such scission is preferred. The maleic anhydride then is grafted onto the scissioned end of one side of such broken chains. In this manner, the anhydride groups are located principally at the ends of the maleated polypropylene chains, and the substantial majority of such maleated polypropylene chains contain one site of maleation. This procedure permits grafting of the maleated polypropylene at its maleated end to the maleated block copolymer though the use of a difunctional linking or grafting agent having two functional groups, each functional group being reactive with a maleate group on the polypropylene and with a maleate group on the block interpolymer. Multiple sites of maleation can lead to grafting of the maleated polypropylene to more than one maleated block copolymer polymer chain or at more than one site of one or more maleated block copolymer.

Free radical initiator preferably is utilized in an amount of from about 0.01 to 1.0 wt. %, more preferably from about 0.02 to 0.5 wt. %, and most preferably from about 0.04 to 0.3 wt. %, of the total polypropylene and solvent (if used) and preferably is added first. The mixture is then heated to a temperature at or about the known decomposition temperature of the selected free radical initiator, concurrently with any optional mechanical shearing. The maleic anhydride is subsequently added in an amount from about 0.01 to 10.0 wt. %, preferably, from about 0.1 to 5 wt. %, and most preferably, about 0.75 to 2 wt. % of the total polypropylene.

The maleated polypropylene contains from about 0.01 wt. % incorporated maleic anhydride, based upon the weight of the maleated polypropylene, up to about 5 wt. %. Preferably, the maleic anhydride content is from about 0.01 to about 2 wt. %, most preferably, about 0.03 to about 0.2 wt. %. Unreacted polypropylene also is present in the reaction mix as are minor amounts of reaction byproducts, such as decomposed free radical initiator compounds and low molecular weight free radical products. These byproducts can be substantially removed by known methods such as sparging with $N_2$ or washing with water. Substantial amounts of maleic anhydride in the polymer can have detrimental effects on the subsequent reaction of the maleimide copolymer with the maleated polypropylene and, therefore, are undesirable.

Grafting of the maleated polypropylene to the maleimide interpolymer is performed by adding a grafting agent such as a polyamine, preferably an organic diamine, to a blend of maleated polypropylene and the maleimide interpolymer so as to partially crosslink them through the maleate functional groups. This grafting is performed by reacting from about 50 to about 99 wt. % of the maleimide interpolymer and about 1 to about 50 wt. % of a maleated polyalkylene, preferably polypropylene, and from about 0.01 to about 10 wt. % of a diamine under substantially dry conditions sufficient to form a polyalkylene-grafted centipede polymer.

Suitable organic diamines or diamine mixtures useful as grafting agents are those containing two (cyclo)aliphatically bound primary amino groups. Such diamines have the general formula $R^3(NH_2)_2$ where $R^3$ represents a $C_2$-$C_{20}$ aliphatic hydrocarbon group, a $C_4$-$C_{20}$ cycloaliphatic hydrocarbon group, a $C_6$-$C_{20}$ aromatic hydrocarbon group, or a $C_4$-$C_{20}$ N-heterocyclic ring. Examples include ethylene diamine; 1,2- and 1,3-propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyl-diaminohexane; 1,8-diaminooctane; 1,10-diaminodecane; 1,11-diaminoundecane; 1,12-diaminododecane; 1-methyl-4-(aminoisopropyl)-cyclohexylamine; 3-aminomethyl3,5,5-trimethyl-cyclohexylamine; 1,2-bis-(amino-methyl)-cyclobutane; 1,2-diamino-3,6dimethylbenzene; 1,2- and 1,4-diamino-cyclohexane; 1,2-; 1,4-; 1,5-; and 1,8-diaminodecalin; 1-methyl-4-aminoisopropyl-cyclohexylamine; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-amino-cyclohexyl)-methane and -propane, 1,4-bis-(2-aminoethyl)-benzene; benzidine; 4,4'-thiodianiline, 3,3'-dimethoxybenzidine; 2,4-diaminotoluene, diaminoditolylsulfone; 2,6-diaminopyridine; 4-methoxy6-methyl-m-phenylenediamine; diaminodiphenyl ether; 4,4'-bis(otoluidine); o-phenylenediamine; methylene-bis(o-chloroaniline); bis(3,4diaminophenyl)sulfone; diaminodiphenylsulfone; 4-chloro-o-phenyl-enediamine; m-amino-benzylamine; n-phenylenediamine; 4,4'-$C_1$-$C_6$-dianiline, such as 4,4'-methylenedianiline; aniline-formaldehyde resin; and trimethylene glycol di-p-aminobenzoate. Mixtures of these diamines may also be used. Other suitable polyamines for use as grafting agents include bis-(aminoalkyl)-amines, preferably those having a total of from 4 to 12 carbon atoms, e.g., bis-(2-aminoethyl)-amine, bis-(3-aminopropyl)amine, bis-(4-aminobutyl)-amine, and bis-(6-aminohexyl)-amine, and isomeric mixtures of dipropylene triamine and dibutylene triamine. Hexamethylene diamine, tetramethylene diamine, and especially 1,12-diaminododecane are preferably used.

The amounts of maleimide interpolymer and maleated polypropylene reacted can vary somewhat depending upon the properties desired in the final composition. In general, the amounts of maleated polypropylene included in the grafted composition may range from about 1 to about 50% by weight based on total weight of composition. Preferred amounts of maleated polypropylene are from 1 to 30% by weight, with a particularly preferred amount being from 10 to 25% by weight. Amounts of maleimide centipede polymer included in the grafted composition may range from about 99 to about 50% by weight, based on total weight of the composition; preferred amounts of centipede polymer are from 99 to 70% by weight, with a particularly preferred amount being from 90 to 75% by weight.

In broadest terms, the process for preparing the grafted polymer includes combining a maleimide interpolymer with a maleated polyalkylene and grafting agent under conditions sufficient to permit grafting of at least a minor portion of the maleimide interpolymer onto the polyalkylene. The grafting reaction is accomplished by contacting the grafting agent and the maleimide interpolymer with the maleated polypropylene whereupon interaction and crosslinking take place. Apparently, the primary amino groups of the grafting agent react to form covalent (imide) bonds with the maleic moieties of the maleated polyalkylene and the maleimide interpolymer.

A proportion of approximately 0.5 molar equivalent of grafting agent per molar equivalent of maleic moiety can be employed due to the difunctionality of the grafting agent. The contacting can be accomplished by combining solutions of the polymeric reactants in suitable solvents, such as benzene, toluene, and other inert organic and inorganic solvents, in a suitable reaction vessel under substantially anhydrous conditions. Heating accelerates the reaction and is generally desirable.

The centipede polymer gels of the present invention have an extender added to the prepared grafted interpolymers during final processing. Suitable extenders include extender oils and low molecular weight compounds. Suitable oils include those known in the art, such as naphthenic, aromatic, and paraffinic petroleum oils, and silicone oils Examples of low molecular weight organic compounds include low molecular weight organic materials having a number-average molecular weight ($M_n$) of less than 20,000, preferably less than 10,000, and most preferably less than 5000, examples of which include one or more of (1) softening agents such as aromatic, naphthenic, and paraffinic softening agents for rubbers or resins;

(2) plasticizers such as those composed of esters including phthalic, mixed phthalic, aliphatic dibasic acid, glycol, fatty acid, phosphoric and stearic esters, epoxy plasticizers, other plasticizers for plastics, and phthalate, adipate, sebacate, phosphate, polyether, and polyester plasticizers for NBR;

(3) tackifiers such as coumarone resins, coumarone-indene resins, terpene phenol resins, petroleum hydrocarbons, and rosin derivatives;

(4) oligomers such as crown ether, fluorine-containing oligomers, polybutenes, xylene resins, chlorinated rubber, polyethylene wax, petroleum resins, rosin ester rubber, polyalkylene glycol diacrylate, liquid rubber (polybutadiene, styrenelbutadiene rubber, butadiene-acrylonitrile rubber, polychloroprene, and the like), silicone oligomers, and poly(α-olefins);

(5) lubricants such as hydrocarbon lubricants, such as paraffin and wax, fatty acid lubricants, such as higher fatty acid and hydroxy-fatty acid, fatty acid amide lubricants, such as fatty acid amide and alkylene-bis-fatty acid amide, ester lubricants, such as fatty acid-lower alcohol ester, fatty acid polyhydric alcohol ester and fatty acid-polyglycol ester, alcoholic lubricants, such as fatty alcohol, polyhydric alcohol, polyglycol and polyglycerol, metallic soaps, and mixed lubricants; and (6) petroleum hydrocarbons such as synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins.

Other appropriate low-molecular weight organic materials include latexes, emulsions, liquid crystals, bituminous compositions, and phosphazenes.

The grafted polymer can have added thereto at least about 1 pbw, preferably 30 to 1000 pbw, extender per 100 pbw grafted interpolymer. Most preferred amounts of added extender include from about 50 to about 500 pbw extender per 100 parts grafted interpolymer and ideally about 80 to about 300 pw extender per 100 pbw grafted interpolymer. The weight % ratio of the polyalkylene grafted maleimide interpolymer to the extender is from about 100:1 to about 1:100, preferably, from 5:1 to about 1:5.

In a preferred embodiment, the process for preparing the gel composition includes the following steps:
  a) combining a commercially available maleic anhydride interpolymer and a primary amine under substantially dry conditions sufficient to react substantially most of the anhydride moieties to form a maleimide interpolymer;
  b) mixing in a commercially available maleated polypropylene under substantially dry conditions at elevated temperature, preferably without prior cooling and grinding the reaction product of the first step;
  c) adding a diamine, without prior cooling and grinding the reaction product of the second step, under a condition of agitation sufficient to form a grafted polymer, followed by cooling; and,
  d) to the final polymer, preferably without prior cooling and grinding, adding an extender under conditions of agitation.

The centipede polymers of this invention are preferably manufactured by mixing and dynamically heat-treating the components described above, such as, by melt-mixing. In a preferred embodiment, the reaction is carried out in a high shear mixer, such as a mixer with sigma blades (dispersion blades) operating at high speed. Sigma blades are designed to provide a large surface area of contact between the mixing components. Additionally, since the reaction generates water, a high shear mixer serves to break up the solid and highly viscous materials and allow them to release water. Such mixers are capable of maintaining a speed of 20-40 rpm, even when the reaction mixture solidifies. Suitable high shear mixers include MXE-6 (6 liter) and ME-15-SL (20 gallon, approximately 80 liters) kneader extruders (both from Jaygo, Inc.) and DS3-10™ (3-liter) kneader (Moriyama). A ram can be applied to apply pressure to the mass of reactants/products during mixing to maintain intimate contact between the mixture and the mixer blades.

A preferred high shear mixer 10 is shown in FIG. 1. The mixer has sigma blades 12 disposed in mixing cavity 14. A charge of reactants is introduced to the cavity through chute 16. The mixer includes ram 18 which is positioned in the chute during mixing. Once the reactants have been added, ram 18 is lowered into the chute and held under pressure to keep the components in contact with front and back blades, 12A and 12B. Preferably, ram 18 is pushed only partly down the chute so that a narrow, annular gap 20 is left between the ram and the port for escape of water (steam) during step (b) of the reaction. Rotating screw 22 is positioned at the base of the mixer.

A high shear mixer allows the reaction to be carried out without the need for grinding the reaction products of each reaction step into powder and returning the powder to the mixer for the next reaction step. The ingredients can be added stepwise to the mixer and maintained, by high speed and shear, in a condition that allows subsequent reaction steps to be carried out without dropping the reaction products out of the mixer for grinding.

Reaction of the primary amine and maleic anhydride interpolymer is carried out at a temperature and pressure as described previously, under substantially dry conditions. The reactants are preferably dry mixed in the absence of solvents. The mixer may be purged with $N_2$ prior to the charging of the reactants. The primary amine may be added in a single charge or in sequential partial charges into the mixer containing th maleic anhydride interpolymer. Preferably, the primary is amine is charged in ratio of from 0.8 to 1.0 moles of amine per maleic anhydride-contributed mer unit in the maleic anhydride interpolymer.

This reaction may be carried out in a high shear reactor or in a separate container. In a preferred "premix" procedure, the primary amine and maleic anhydride interpolymer are mixed together at room temperature and left to react for about 20 hours. At low temperatures, fewer problems arising from the liberation of amine vapor (which may be toxic) arise. Using a premix step allows the reaction product of step (a) to be added to a heated mixer. For example, the mixer may be heated to a temperature of about 180° to 190° C. before addition of the reaction product of step (a).

Alternatively, the amine and maleic anhydride interpolymer can be reacted at higher temperatures and in a shorter time in the high shear mixer. For example, the reactants are first mixed at a temperature of from room temperature to about 100° C. (i.e., below the boiling point of the amine selected), then heated slowly while mixing. In this case, the maleimide interpolymer reaction product preferably is kept in the mixer with mixing, without a separate step of cooling and grinding, until commencement of the next step.

Grafting preferably is carried out in the high shear mixer by adding maleated polyalkylene to the maleimide reaction product previously formed. The components are mixed thoroughly so as to disperse them prior to the crosslinking agent being added. The crosslinking agent reacts with both the maleated polyalkylene and the maleimide yielding a mixture of roughly one part of a diamine-linked maleimide polymer, one part of a diamine-linked polyalkylene homopolymer, and two parts of the grafted centipede polymer. Preferred temperatures for this reaction range from about 75° to about 300° C., preferably from about 120° to about 250° C., and more preferably from 150° to 250° C.

Step (d) may be carried out after completion of the grafting reaction, without a need for cooling the polyalkylene grafted centipede polymer, grinding the cooled mass, and reheating in the reactor. The product of step (c) is cooled in the mixer, while mixing, until a temperature where the extender can be added is reached. Finally, the extended centipede polymer is expelled from the mixer and may then be further extended to achieve desired gel properties. Thus, the reactants and reaction products can stay in the mixer through each of the steps until the extended composition is provided. The batch process thus described reduces processing time considerably by eliminating of intermediate cooling and grinding steps. For example, each step can be carried out in the mixer in 6-7 no more than about 7 hours, preferably within about 2 hours, most preferably in about an hour or less.

The polymer gels produced according to the present invention generally have high damping properties, i.e., they have a tan δ in the range of about 0.1 to about 1.0 or more, preferably higher than 0.3 over the temperature range of 30° to 100° C. They preferably have a Shore A hardness at room temperature ranging from 0 to about 50, preferably from about 0 to about 30, most preferably from about 5 to 20 at about 20° to 25° C. The service temperature is less than or equal to 100° C. for most of the polymers of the present invention. For example, the 100° C. compression set of a gel is typically about 50. Some of the extended polymers of the present invention, however, have a potential use up to about 140° C.

Inclusion of one or more additives known in the rubber art in the compositions sometimes can be desirable. Stabilizers, antioxidants, conventional fillers, reinforcing agents, reinforcing resins, pigments, fragrances, and the like are examples of some such additives. Specific examples of useful antioxidants and stabilizers include 2-(2'-hydroxy-5'-methylphenyl) benzotriazole, nickel dibutyldithiocarbamate, zinc dibutyl dithiocarbamate, tris(nonylphenyl) phosphite, 2,6-di-t-butyl-4-methylphenol, and the like. Exemplary conventional fillers and pigments include silica, carbon black, titanium dioxide, iron oxide, and the like. These compounding ingredients are incorporated in suitable amounts depending upon the contemplated use of the product, preferably, in the range of 1 to 350 parts of additives or compounding ingredients per 100 parts of polyalkylene-grafted interpolymer.

A reinforcement may be defined as a material that is added to a resinous matrix to improve the strength of the polymer. Most reinforcing materials are inorganic or organic products of high molecular weight. Examples of reinforcing materials include glass fibers, asbestos, boron fibers, carbon and graphite fibers, whiskers, quartz and silica fibers, ceramic fibers, metal fibers, natural organic fibers, and synthetic organic fibers.

Other elastomers and resins are also useful to enhance specific properties, such as damping properties, adhesion, and processability. Examples of such other elastomers and resins include adhesive-like products such as Reostomer™ (Riken-Vinyl Inc.); hydrogenated polystyrene, polyisoprene-polystyrene block interpolymers such as Hybler™ (Kurare Inc.); polynorbomenes such as Norsorex™ (Nippon Zeon Inc.); and the like.

Gels containing oil extended, grafted interpolymers can be manufactured by mixing and dynamically heat-treating the components described above, namely by melt-mixing. As for the mixing equipment, any conventional, generally known equipment such as an open-type mixing roll, closed-type Banbury mixer, extruding machine, kneader, continuous mixer, etc., is acceptable. The closed-type is preferable, and mixing in an inert gas environment, such as $N_2$ or Ar, is also preferable. As discussed above, for minimizing processing steps, a high shear mixer, such as a Jaygo, Inc. MXE-6 mixer is preferred. The process can then proceed from one step to the next in the mixer, if desired, including the step of adding an extender, without the need for removing the intermediate products, grinding, returning the ground product to the mixer, and heating to the desired temperature, before continuing with the next step.

The composition obtained using the manufacturing method of this invention can be molded with equipment conventionally used for molding thermoplastics. It is suitable for extrusion molding, calendar molding, and particularly injection molding.

The composition of the present invention can be mixed in any conventional mixer, such as a Banbury mixer or roll mill or kneader-extruder, normally conducted within the temperature range of about 120° to about 300° C., preferably maintaining the composition above its melting point for a period of from a few minutes up to several hours, most preferably from 10 to 40 minutes A particularly useful technique is to add any fillers in the beginning of the mixing cycle in order to take maximum advantage of heating time and to prevent surface bleeding and overheating when forming the molded articles.

The resultant gel composition may be molded in appropriate press ovens and the like to form products in the form of extruded pellets, cut dice, preferably, as small as possible since smaller pellets provide short heating times and better flow when utilized in flow molding. Ground pellets may also be utilized.

The extended grafted centipede polymers of the present invention can be used in high temperature applications including uses in injection molding or in any other compositions typically used for elastomeric properties. In summary, the molded polymers produced from the gels containing extended, grafted maleimide interpolymers retain elastomeric characteristics and are useful in high temperature applications and/or high damping applications.

Damping is the absorption of mechanical energy by a material in contact with the source of that energy. Damping or mitigating the transmission of mechanical energy from, e.g., a motor, engine, or power source, to its surroundings often is desirable, and elastomeric materials are often used for this purpose. Such materials preferably are highly effective in converting this mechanical energy into heat rather than transmitting it to the surroundings over a wide range of temperatures and frequencies commonly found near motors, automobiles, trucks, trains, planes, and the like. A convenient measurement of damping is the determination of a parameter called tan δ. A forced oscillation is applied to a material at frequency and the transmitted force and phase shift are measured. The phase shift angle delta is recorded. The value of tan δ is proportional to the ratio of energy dissipated to energy stored. The measurement can be made by any one of several commercial testing devices, and may be made by a sweep of frequencies at a fixed temperature, then repeating that sweep at several other temperatures, followed by the development of a master curve of tan δ vs. frequency by curve alignment. An alternate method is to measure tan δ at constant frequency (such as at 10 Hz) over a temperature range. A thermoplastic, unfilled material can be useful for damping when tan δ is greater than ~0.3 over at least a 4 decade range, preferably a 6 decade range, of frequency.

This high degree of absorption of energy needs to be accompanied by good mechanical and thermal stability, as the part prepared from the subject polymers will be cycled through various environments and repeatedly exposed to various forces of compression, tension, bending, and the like.

The compositions of the present invention are favorably used in the manufacturing of any product in which the following properties are advantageous: a high degree of softness, heat resistance, decent mechanical properties, elasticity and/or high damping. The compositions of the present invention can be used in particular in the fabrication of automotive parts, household electrical appliances, industrial machinery, precision instruments, transport machinery, constructions, engineering, and medical instruments.

Representative examples of the use of the extended graft polymers of the present invention are in the fabrication of damping materials and vibration restraining materials. These uses involve connecting materials, such as sealing materials, packing, gaskets, and grommets; supporting materials such as mounts, holders, and insulators; and cushion materials, such as stoppers, cushions, and bumpers. These materials are also used in equipment producing vibration or noise and household electrical appliances, such as in air-conditioners, laundry machines, refrigerators, electric fans, vacuums, driers, printers, and ventilator fans. Further, these materials are also suitable for impact absorbing materials in audio equipment and electronic or electrical equipment, sporting goods, and shoes. Further, as super low hardness rubbers, these materials are applicable for use in appliances, damping rubbers, and as low hardness plastics, and it is preferable for molding materials. Further, because the present compositions can control the release of internal low molecular weight materials incorporated therein, they can be useful as a release support to emit materials such as fragrance materials, medical materials, and other functional materials. The compositions of the present invention also possess utility in applications of use in liquid crystals, adhesive materials, and coating materials.

In the following examples, the present invention will be described in more detail with reference to non-limitative embodiments.

EXAMPLES

In the following examples, Compression Set (C.S.) was measured according to ASTM Standard D395-89, except that the sample size and displacement were changed as follows:
Sample thickness—1.27 cm
Sample diameter—140 cm
Displacement—The sample was compressed to 0.94 cm (i.e., a reduction of 0.33 cm in thickness) and stored in an oven at 100° C. (or at 150° C. in subsequent examples) for 22 hours. The sample was removed from the oven, the stress on the sample was relieved, the sample was stored at room temperature for 30 minutes, and the recovery of the sample was measured as the final sample height in cm as X:

$$C.S.=[(1.27-X)/(0.33)]\times 100\%$$

Examples 1 and 2

Preparation of Centipede Polymer Gels in a Large Mixer

To an ME-15-SL kneader-extruder equipped with sigma blades were added amount $m_1$ of Scripset™ 520 poly(maleic anhydride-alt-styrene) (Monsanto) in Example 1 or Isoban™ 10 poly(maleic anhydride-alt-isoprene) (Kuraray) in Example 2 as well as amount $m_2$ octylamine (BASF, 99% purity) at temperature $T_1$. Mixing was started with a front blade speed of 31 rpm, a back blade speed of 24 rpm, and a screw speed of $v_s$. After time $t_1$, the oil heater was turned on. The batch was raised to temperature $T_2$ over time $t_2$. Water vapor was vented through a 2.54 cm pore at the top-lid (ram) of the mixer.

Mixing was continued for additional time $t_3$ (isothermally in Example 1, but with the temperature being increased to 215° C. in Example 2). In Example 1, a vacuum (0.98 MPa) was pulled on the batch for 30 minutes to remove any remainaing volatiles.

Approximately 10 g samples of the maleimide interpolymers were taken from the mixer and analyzed. For each, the $M_n$, $M_w$, intrinsic viscosity (I.V.) in tetrahydrofuran (THF), and acid value (using NaOH titration of a THF solution) were measured.

To the mixer were added amount $m_3$ of PO1015™ maleated polypropylene (Exxon) and, in Example 1, 4.96 kg di(tridecyl)phthalate or DTDP (C.P. Hall Co.). After time $t_4$ of mixing (in Example 2, time t4 was split into alternating 5-minute segments of the blades turning forward and then backward), amount $m_4$ of dodecane diamine (Aldrich, 98% purity) was charged to the mixer The mixer was cooled to temperature $T_3$ over time $t_5$.

To the mixer was charged amount $m_5$ of an extender oil, trioctyl phosphate or TOP (C.P. Hall Co.) in Example 1 and DTDP in Example 2.

After time $t_6$ of mixing, the final product was extruded through a 0.64 cm die. The product was further extended with oils to y final weight percent oil. The resulting extended product was thereafter molded into sheets and cylinder buttons at 155° C. Hysteresis (tan δ) and compression set (C.S.) measurements were made on each. Ring samples were cut from these sheets for tensile measurements ($T_b$ is the tensile strength at break, and $E_b$ is elongation at break).

The values for each of the foregoing variables and the values of each of the tests conducted are given below in Table 1. The data of this table indicate that the materials from Examples 1 and 2 were soft, thermoreversible gels that exhibited very well balanced tensile strength, damping properties, and thermostability. Further, they were thermally recyclable at 160° C. and had a service temperature of up to 100° C.

TABLE 1

Data relating to Examples 1 and 2

|  | Ex. 1 | Ex. 2 |
|---|---|---|
| Amounts of material (kg) | | |
| $m_1$ | 25.95 | 23.5 |
| $m_2$ | 16.23 | 18.64 |
| $m_3$ | 9.8 | 10.59 |
| $m_4$ | 0.462 | 0.433 |
| $m_5$ | 4.97 | 26.37 |
| Temperatures (° C.) | | |
| $T_1$ | 93 | 40 |
| $T_2$ | 210 | 215 |
| $T_3$ | 190 | 177 |
| Times (min.) | | |
| $t_1$ | 15 | 10 |
| $t_2$ | 75 | 80 |
| $t_3$ | 90 | 120 |
| $t_4$ | 15 | 25 |
| $t_5$ | 15 | 10 |
| $t_6$ | 30 | 240 |
| Screw speed, $v_s$ (rpm) | 22 | 40 |
| Properties of the maleimide interpolymers | | |
| $M_n$ | 54,600 | 89,055 |
| $M_w$ | 260,200 | 201,150 |
| $M_w/M_n$ | 4.76 | 2.26 |
| I.V. (100 mL/g) | 0.70 | 0.69 |
| Acid value (meq/g) | 0.100 | 0.128 |
| Properties of the final gels | | |
| Oil content (%) | 50 | 66 |
| Shore A hardness | 5 | 4 |
| C.S. at 100° C. (%) | 57 | 42 |
| $T_b$ (kg/cm$^2$) | 3.59 | 2.19 |
| $E_b$ (%) | 260 | 244 |
| tan δ | 0 55 | 0.44 |

Example 3

Preparation of Centipede Polymer Gel in a Small Mixer

To an MXE-6™ kneader-extruder equipped with sigma blades were added 1.25 kg Isoban™ 10 poly(maleic anhydride-alt-isobutylene) and 0.99 kg octylamine at 54° C. Mixing at a blade speed of 25 rpm and a screw speed of 40 rpm for 5 minutes was undertaken followed by the mixer being heated at a rate of about 3° C./min to 190° C.; mixing was continued at that temperature for 2 more hours.

To the mixer was added 0.56 kg maleated polypropylene and mixing continued for another 30 minutes. Then, 23 g dodecane diamine was added to the mixer. After an additional 15 minutes of mixing, 1.40 kg DTDP was added and the temperature of the mixer was adjusted to 160° C.

After another 2 hours of mixing, the final product was extruded through a 0.64 cm die. The final product contained 33% DTDP and was a thermoreversible elastomer.

Example 4

Preparation of a Centipede Polymer Gel Using a Premix Step

To a bucket was added 0.8835 kg Isoban™ 10 poly(maleic anhydride-alt-isobutylene). Into that bucket was pumped 0.6979 kg octylamine at room temperature. After 10 minutes of mixing, the temperature of the mixture rose to about 80° C.; however, after 2-3 hours, the temperature had returned to ambient. The reaction was 99.5% complete after 24 hours at room temperature.

The granules formed in the reaction were placed into the mixing chamber of a DS3-10™ kneader equipped with an electric heater at the bottom of the mixing chamber, a steam heater at the blade, a lid with a fitted ram, and a 2TR-75 twin tapered screw extruder/hot face pelletizer (Moriyama). The blade speed was 40 rpm. Mixing was commenced, and the temperature dropped from 175° to 141° C. After about 10 minutes, the temperature was about 180° C. and the torque had increased. Over the next 10 minutes, the temperature rose to between 185° and 190° C. Steam was ventilated from the chamber by a gap around the ram of the chamber. At about 30 minutes after commencement of the reaction, the temperature had dropped from 187° to 161° C., and a sample of the mixture was taken for analysis.

Thereafter, 397.1 g maleated polypropylene was added and mixing re-started. After another 20 minutes (i.e., 50 minutes after commencement of the reaction), at which time the temperature was about 185° C., 16.8 g dodecane diamine (Kanto Chemical) was added and further mixed. After about 1 minute, the torque increased slightly and then, after another minute, slowly began to decrease. After 20 minutes (i.e., 70 minutes after commencement of the reaction), at which time the temperature had dropped from 187° to 160° C., 0.9859 kg KAO Vinisizer™ 20 DTDP was added and further mixed again. After another 10 minutes, the temperature was about 185° C. The resulting material was expelled by tilting the chamber.

The process was repeated using a DS10-30™ 10 L vessel (Moriyama) in place of a 3 L vessel. Process conditions were similar, except that the temperatures reached in the mixer were slightly higher, around 190-195° C. at maximum. The quantities used in the 10 L process were 2.371 kg Isoban™ 10 poly(maleic anhydride-alt-isobutylene), 1.873 kg octylamine, 1.065 kg maleated polypropylene, 45 g dodecane diamine, and 2.645 kg DTDP.

Results of the 3 L and 10 L processes are shown in Table 2. The results show that the properties vary to some extent depending on the mixer selected but are nonetheless excellent.

TABLE 2

Physical properties of Samples Prepared in 3L and 10L mixers

|  | 3L mixer | 10L mixer |
| --- | --- | --- |
| Hardness, (ASKER-C at 27° C.) | 47 | 37 |
| Tan δ at 20° C. |  |  |
| 40 Hz | 1.0 | 1.0 |
| 1 Hz | 0.6 | 0.6 |
| C.S. (%) at 100° C. | 47 | 57 |

We claim:

1. A process for forming an extended polyalkylene-grafted interpolymer or gel, comprising:
    a) in a mixer, mixing
        1) a polymer comprising mer units derived from maleic anhydride and mer units derived from at least one of
            (A) a vinyl aromatic monomer, and
            (B) an $R^1(R^2)$ethylene monomer in which $R^1$ and $R^2$ independently are selected from H and substituted or unsubstituted $C_1$-$C_{20}$ alkyl or alkoxyl groups, and
        2) a maleated polyalkylene, so as to form a blend;
    b) in said mixer, adding to said blend a diamine and allowing it to react with the mer units derived from maleic anhydride and with the maleated polyalkylene to form a polyalkylene grafted interpolymer; and
    c) allowing the polyalkylene-grafted interpolymer to cool in said mixer and, without removing the interpolymer from the mixer, adding an extender to provide said extended polyalkylene-grafted interpolymer; and
    d) optionally, extruding the extended polyalkylene-grafted interpolymer to form a gel having a tan δ of at least 0.3.

2. The process of claim 1 wherein step a) includes mixing from about 50 to about 99 weight % of said polymer and from about 1 to about 50 weight % of said maleated polyalkylene and wherein step b) includes from about 0.1 to about 10 weight % of said diamine.

3. The process of any of claim 1 wherein said polymer comprises from about 0.01 to about 5 weight percent mer units derived from maleic anhydride.

4. The process of any of claim 1 wherein steps b), c) and, optionally a) are carried out sequentially with no physical manipulation of said polyalkylene grafted interpolymer prior to step c).

5. The process of any of claim 1 wherein step c) includes mixing about 10 to about 90 weight percent of said polyalkylene-grafted interpolymer with a total amount of about 90 to about 10 weight percent of said extender.

6. The process of any of claim 1 wherein at least one of the following is true:
    said vinyl aromatic monomer is selected from any one or more of styrene, α-methylstyrene, p-methylstyrene, 4-phenylstyrene, m-methylstyrene, o-methylstyrene, p-tert-butylstyrene, and dimethylstyrene; and
    $R^1$ and $R^2$ independently are selected from methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyoctyl, methoxynonyl, ethoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyheptyl, propoxyoctyl, propoxynonyl, propoxydecyl, butoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptyloxynonyl, heptyloxydecyl, octyloxymethyl, oxtyloxyethyl, octyloxypropyl, octyloxybutyl, octyloxypentyl, octyloxyhexyl, octyloxyheptyl, octyloxyoctyl, oxtyloxynonyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-methylpentyl, 2-methylhexyl, 2-methylheptyl, 2-methyloctyl, 2,3,3-trimethylbutyl, 3-methylpentyl, 2,3-dimethylpentyl, 2,4-dimethylpentyl, 2,3,3,4-tetramethylpentyl, 3-methylhexyl, and 2,5-dimethylhexyl.

7. The process of any of claim 1 wherein said maleated polyalkylene includes mer units derived from at least one of ethylene and propylene.

8. The process of any of claim 1 wherein, prior to step a), an amine is reacted with a portion of the mer units derived from the maleic anhydride to form maleimide mer units, wherein at least one of the following optionally is true of said imidization:

it is carried out immediately preceding step a) with no physical manipulation of the polymer prior to step a), and it and step a) are carried out in a mixer without removing the imidization product from the mixer.

9. The process of claim 8, wherein said amine comprises from 1 to 50 carbon atoms and is selected from at least one of alkyl amines, alkyl benzyl amines, alkyl phenyl amines, alkoxybenzyl amines, alkyl aminobenzoates, and alkoxy aniline.

10. The process of claim 8, wherein said amine is a primary amine.

11. The process of any of claim 1 wherein said diamine is selected from aliphatic or cycloaliphatic diamines corresponding to the general formula $R^3(NH_2)_2$ wherein $R^3$ represents 1) a $C_2$-$C_{20}$ aliphatic hydrocarbon group,
2) a $C_4$-$C_{20}$ cycloaliphatic hydrocarbon group,
3) a $C_6$-$C_{20}$ aromatic hydrocarbon group, or
4) a $C_4$-$C_{20}$ N-heterocyclic ring.

12. The process of claim 11, wherein said diamine is selected from at least one of ethylene diamine; 1,2-propylene diamine; 1,3-propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyl-diaminohexane; 1,8-diaminooctane; 1,10-diaminodecane; 1,11-diaminoundecane; 1,12-diaminodo-decane; 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2-diaminocyclohexane; 1,4-diaminocyclohexane; 1,2-diaminodecalin; 1,4-diaminodecalin; 1,5-diaminodecalin; 1,8-diaminodecalin; 1-methyl-4-aminoisopropyl-cyclohexylamine; 4,4'-diaminodicyclohexyl; 4,4'-diamino-dicyclohexyl methane; 2,2'-(bis4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane; 3,3',5,5'-tetramethyl-bis-(4-aminocyclohexyl)-propane; 1,4-bis-(2-aminoethyl)-benzene; benzidine; 4,4'-thiodianiline; 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); ophenylenediamine; methylene-bis(o-chloroaniline); bis(3,4-diaminophenyl)sufone; diaminodiphenylsulfone; 4-chloro-o-phenylenediamine; m-aminobenzylamine; m-phenylenediamine; 4,4'-$C_1$-$C_6$-dianiline; aniline-formaldehyde resin; trimethylene glycol di-p-aminobenzoate; bis-(2-aminoethyl)-amine; bis-(3-aminopropyl)-amine; bis-(4-aminobutyl)amine; bis-(6-aminohexyl)-amine; and isomeric mixtures of dipropylene triamine and dibutylene triamine.

13. A single batch process for preparing a polymer composition which includes a polyalkylene-grafted interpolymer, said process comprising:

a) forming a maleimide interpolymer in a mixing vessel by reacting an amine with a portion of maleic anhydride-derived mer units of an interpolymer comprising maleic anhydride-derived mer units and at least one of
1) vinyl aromatic-derived mer units, and
2) $R^1(R^2)$ethylene-derived mer units in which $R^1$ and $R^2$ independently are H or substituted or unsubstituted $C_1$ to $C_{20}$ alkyl groups or alkoxyl groups;

b) without removing the product of step a) from the mixing vessel, adding sufficient maleated polyalkylene such that the mixing vessel contains from about 1 to about 50 weight percent maleated polyalkylene and from about 50 to about 99 weight percent maleimide interpolymer;

c) mixing from about 0.1 to about 10 weight % of a diamine with the maleimide interpolymer and maleated polyalkylene in the mixing vessel to form said polyalkylene-grafted interpolymer; and d) without removing the product of step c) from the vessel, cooling the polyalkylene-grafted interpolymer in the mixer to a temperature at which an extender is stable in the polyalkylene-grafted interpolymer, and adding an extender to the mixer.

14. The process of claim 13 wherein said interpolymer that reacts with said amine in step a) comprises from about 0.01 to about 5 weight percent mer units derived from maleic anhydride.

15. The process of claim 13 wherein said vinyl aromatic-derived mer units are derived from any one or more of styrene, α-methylstyrene, p-methylstyrene, 4-phenylstyrene, m-methylstyrene, o-methylstyrene, p-tert-butylstyrene, and dimethylstyrene.

16. The process of claim 13 wherein $R^1$ and $R^2$ independently are selected from methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyoctyl, methoxynonyl, ethoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyheptyl, propoxy-octyl, propoxynonyl, propoxydecyl, butoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyoxhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptyloxynonyl, heptyloxydecyl, octyloxymethyl, oxtyloxyethyl, octyloxypropyl, octyloxybutyl, octyloxypentyl, octyloxyhexyl, octyloxyheptyl, octyloxyoctyl, oxtyloxynonyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-methylpentyl, 2-methylhexyl, 2-methylheptyl, 2-methyloctyl, 2,3,3-trimethylbutyl, 3-methylpentyl, 2,3-dimethylpentyl, 2,4-dimethylpentyl, 2,3,3,4-tetramethylpentyl, 3-methylhexyl, and 2,5-dimethylhexyl.

17. The process of claim 13 wherein said maleated polyalkylene comprises mer units derived from at least one of ethylene and propylene.

18. The process of claim 13 wherein said amine comprises from 1 to 50 carbon atoms and is selected from at least one of alkyl amines, alkyl benzyl amines, alkyl phenyl amines, alkoxybenzyl amines, alkyl aminobenzoates, and alkoxy aniline.

19. The process of claim 13 wherein said amine is a primary amine.

* * * * *